United States Patent [19]
Ayres et al.

[11] 3,772,038
[45] Nov. 13, 1973

[54] METHOD OF MAKING PEANUT BUTTER IN SLICED FORM

[75] Inventors: James L. Ayres, Stone Mountain; Jeffrey D. Peterson; John R. Palmer, both of Conyers, all of Ga.

[73] Assignee: Gold Kist Inc., Atlanta, Ga. ; by said Ayres and Peterson

[22] Filed: June 19, 1972

[21] Appl. No.: 264,377

[52] U.S. Cl. .............. 99/128, 53/122, 99/171 LM, 425/308
[51] Int. Cl. .......................... A23l 1/38, B65b 25/08
[58] Field of Search ..................... 99/128, 178, 179, 99/174, 98, 233.11, 233.12, 450.2, 171 LM; 53/122; 425/113, 308

[56] References Cited
UNITED STATES PATENTS

| | | | |
|---|---|---|---|
| 3,127,272 | 3/1964 | Baker et al. | 99/128 |
| 3,044,883 | 7/1962 | Ferguson, Jr. | 99/128 |
| 2,255,032 | 9/1941 | Weisgurt et al. | 99/128 |
| 604,493 | 5/1898 | Kellogg | 99/128 |
| 1,687,154 | 10/1928 | Bolton | 99/128 |
| 3,589,914 | 6/1971 | Cooper et al. | 99/128 X |
| 2,217,701 | 10/1940 | Musner | 99/128 |
| 3,481,746 | 12/1969 | Clemens et al. | 99/178 X |
| 2,759,308 | 8/1956 | Nawrocki | 99/178 UX |
| 3,532,516 | 10/1970 | Erekson | 99/178 X |
| 3,475,184 | 10/1969 | Mers et al. | 99/178 X |

*Primary Examiner*—Frank W. Lutter
*Assistant Examiner*—Steven L. Weinstein
*Attorney*—Harry W. F. Glemser et al.

[57] ABSTRACT

Peanut butter in multi-layer sliced form suitable for refrigerator and freezer storage.

8 Claims, No Drawings

METHOD OF MAKING PEANUT BUTTER IN SLICED FORM

BACKGROUND OF THE INVENTION

1. Field of the Invention

The present invention relates to a method of preparing peanut butter in multi-layer sliced form, wherein each peanut butter slice retains its shape on refrigerator or frozen storage, and can be separated individually without substantial sticking. In particular, the present invention concerns peanut butter in multi-layer form comprising a plurality of peanut butter slices wherein there is interleaved between each peanut butter slice an inert packaging material, whereby each peanut butter slice can be individually peeled from the mass without any substantial sticking thereto or pulling apart of the peanut butter.

2. Description of the Prior Art

Peanut butter is generally dispensed from glass jars or other rigid containers. Removal of the peanut butter from these containers is usually inconvenient, generally requiring the use of a knife or other appropriate utensil. Most peanut butter is consumed with bread, usually in the preparation of sandwiches and the like. It has been proposed to package peanut butter in flexible wrapping similar to that generally used for packaging butter or margarine for household use. In this way cubes or bars of peanut butter could then be packaged and dispensed much in the same manner as butter and margarine, and thus could be readily available for convenient use during meals. However, it has been found difficult to prepare such packages so that the peanut buttter can be removed from the flexible wrapping without the peanut butter sticking to the wrapping or pulling apart. Furher, while the use of a peanut spread packaged in a flexible wrapper similar to that used for the packaging of butter or margarine would be useful and convenient in utilizing peanut butter, such a packaging method does have serious disadvantages. For example, exposure of peanut butter for extended periods of time at room temperature can result in extensive softening of the peanut butter, thereby resulting in a loss of shape to the package of peanut butter and rendering reuse inconvenient. Inasmuch as peanut butter is primarily used in the preparation of sandwiches, it would clearly be more desirable to package the peanut butter in such a form that the desired amounts of the peanut butter could be conveniently used without requiring the peanut butter to be exposed to room temperature and atmospheric conditions for any length of time. Needless to say, prolonged exposure of peanut butter to air at room temperature increases the likelihood of the peanut butter becoming rancid.

It has now been found that peanut butter can be prepared in a multi-layer sliced form comprising a plurality of peanut butter slices wherein each peanut butter slice is sandwiched between layers of inert packaging material whereby the peanut butter slices can be individually separated without sticking to the packaging material or pulling apart. The present method of packaging peanut butter is particularly convenient for many home and institutional situations inasmuch as the sliced peanut butter can be conveniently and rapidly dispensed. Accordingly, the present invention now provides a means for easily and simply preparing peanut butter sandwiches, especially on a large scale such as that encountered in institutions and commercial establishments.

SUMMARY OF THE INVENTION

The present invention provides a peanut butter composition in multi-layer, sliced form suitable for storage at refrigerator and freezer temperatures comprising a plurality of peanut butter slices wherein each peanut butter slice is inter-leaved between layers of an inert packaging material whereby each peanut slice can be separated individually without substantial sticking to the packaging material.

There is further described such compositions wherein the peanut butter contains from about 0.5 to about 3.5 percent by weight of a hardening stabilizer, preferably a mixture of edible mono- and diglycerides, a hydrogenated vegetable oil, a hydrogenated animal oil, or mixtures thereof.

The present invention also describes a method of preparing peanut butter in multi-layer sliced form which comprises
  extruding a continuous layer of peanut butter heated to about 80°–105°F onto a moving continuous layer of packaging material, cooled to about 10°–20°F;
  further cooling the peanut butter until it is substantially hardened;
  cutting the resulting peanut butter-packaging material laminate into sections; and
  stacking the sections in layers whereby each peanut butter section is interleaved between two layers of inert packaging material.

DETAILED DESCRIPTION OF THE INVENTION

The peanut butter compositions of the present invention, which are suitable for storage at refrigerator and freezer temperatures, comprise peanut butter in a multi-layer sliced form wherein th peanut butter slices are individually placed between layers of an inert packaging material, thereby enabling each slice to be individually peeled from the total mass without any substantial sticking or adhesion to the packaging material, or pulling apart of the peanut butter.

The peanut butter product of the invention is prepared by extruding warm peanut butter onto a suitable packaging material that is carried on a cool, continuous conveyor belt, further cooling the peanut butter until it is sufficiently hardened, and then cutting the peanut butter-packing material laminate into sections which are then stacked and packaged for ultimate use. In a preferred embodiment of the invention, it has been found that the adhesiveness or stickiness of the peanut butter slices can be controlled by proper additive formulation. In particular, it has been found that the incorporation into the peanut butter of hardening stabilizers, such as a mixture of edible mono-and diglycerides results in a peanut butter product that melts more slowly than natural peanut butter and is more easily removed from the inner wrap packaging material. Various types of peanuts, such as U. S. No. 1, Spanish, Runner, and Virginia peanuts can be used in practicing the invention. After the peanuts are roasted according to conventional procedures they are then blanched and used directly or blended with additives.

In the preferred embodiments of the invention, the roasted, blanched nuts are ground in a suitable mill, such as a Bauer mill (Model 148 2-8, available from The Bauer Bros. Co., Springfield, Ohio, at plate clearances of 0.005 to 0.04 inches. The temperature of the peanut butter leaving the mill is approximately 130°F. When additives are being used with the peanut butter, they are blended with it at a temperature of about 140°F in a steam kettle. The melted peanut butter is then cooled to the extrusion temperature which is usually about 80°–105°F, whereupon the peanut butter is continuously extruded onto a continuously moving film of packaging material, which is conveyed on a chilled steel belt conveyor. After the peanut butter had sufficiently cooled and hardened, the resulting peanut butter-packaging material laminate is cut into appropriately sized sections and stacked one on top of the other to provide a multi-layer combination comprising individual slices of peanut butter interspersed between packaging material.

A convenient commercially available steel belt conveyor and assembly is the Sandvik Steel Belt unit, available from Sandvik Conveyor, Inc., Fairlawn, New Jersey. An embodiment of this conveyor is described in U. S. Pat. No. 2,855,093.

The steel belt in the unit is provided with two cooling sections providing about 8 feet of effective cooling area. A Dunham-Bush chiller (AMPC 7.5) provides the cooling required for the cooling trays. Propylene glycol (USP) — water (1:1 v/v) is used as a coolant fluid. The coolant is pumped through the trays at approximately 25 gallons/minute and circulated through the cooling trays and thereafter recirculated through the discharge outlets into a 30 gallon reservoir. The coolant is then pumped back into the chilling unit. An external reservoir is necessary to prevent air-lock in the chiller. The coolant is generally maintained at about 10°–20°F with a temperature of from about 12°–16°F being preferred.

A belt speed of about 1.8 feet/minute has been found to give excellent results.

As mentioned above, a continuously moving strip of inner wrap packaging material is carried along on the steel conveyor belt. The type of inner wrap material is not critical and various materials can be used. Particularly preferred films are polyethylene, polypropylene, polyvinylchloride, and aluminum foil with the plastic materials being especially preferred.

In extruding the peanut butter onto the moving film of packaging material, various types of extruder heads can be used. One type that has been found to give excellent results is manufactured by the Palmer Engineering Company, De Pere, Wisc., and is described in U.S. Pat. No. 2,907,109.

The extrusion head is secured to the cooling belt frame and the peanut butter is pumped through a suitable pump into the top of the extrusion head.

As mentioned above, the peanut butter is extruded at a temperature of from about 80°–105°F and leaves the head as a continuous strip, preferably about ¼ inches wide by 0.08–0.10 inches thick. This strip is directed onto the moving belt of inner wrap packaging material, such as a polyvinylchloride or polyethylene film, which is carried along on the conveyor belt. The continuous cooling belt is preferably kept at about 15°F or lower, whereupon after sufficient contact the continuously moving ribbon of peanut butter is ultimately cooled to this temperature. After a sufficient portion of the ribbon of peanut butter has traveled an appropriate length of the belt and is sufficiently hard enough to handle, it is, together with the underlying packaging film, cut size with a guillotine chopper. The resulting sections of peanut butter and attached inner wrap film are then stacked and wrapped with a moisture barrier plastic wrap for ultimate use. The package of multi-layer slices are then kept at refrigerator or frozen temperatures depending upon the formulation for consumer use.

It is preferred to blend the peanut butter with hardening stabilizers in order to control the stickiness of the peanut butter slices. Particularly preferred stabilizers are mixtures of edible mono- and diglycerides, which can optionally contain various stearines such as cotton stearine or peanut stearine. The stearines are generally hydrogenated animal or vegetable oils. Alternatively, various hydrogenated animal or vegetable oils can be used alone or as mixtures. Typical hydrogenated animal and vegetable oils include hydrogenated peanut oil, hydrogenated cottonseed oil, hydrogenated soy bean oil, hydrogenated fish oil and the like. These hardening stabilizers are generally added at a level of from about 0.5–3.5 percent by weight, with a level of from about 2.9–3.5 percent by weight being preferred. Excellent results have been obtained with a level of hardening stabilizer of about 3.2 percent by weight.

Other ingredients can also be blended into the peanut butter such as salt, dextrose, and various sweetening agents. In addition, peanut oil can also be blended in with the ground peanut paste.

After the continuous ribbon or peanut butter has been applied to the packaging film, various foodstuff toppings can also be applied to the peanut butter ribbon after extrusion. Typical foodstuff toppings include chopped nuts, candy, such as chocolate chips and butterscotch, dried fruits such as freeze-dried strawberries, raisins, dehydrated fruit pieces, grated cheese, bacon pieces or bits, pickles, chopped olives, and the like. Ordinarily, after the peanut butter has hardened on the belt, the applied foodstuff toppings are pressed into the ribbon with a roller and the resulting product cut, stacked and wrapped as described above.

The termperature at which the peanut butter is extruded is dependent upon the exact formulation used. Thus, with hardening stabilizers such as the mixture of mono- and diglycerides at higher levels, i.e., at or above 3 percent, the ideal extrusion temperature range is about 96°–102°F. On the other hand, with natural peanut butter wih no additives the preferred temperature extrusion range is about 80°–90°F.

The following examples are provided to illustrate further the scope of the present invention; however, they should not be construed as limitations thereof.

EXAMPLE 1

Thirty pounds of roasted, blanched peanuts were ground with a Bauer mill (Model 148 2-8; available from the The Bauer Bros. Co., Springfield, Ohio, at a plate clearance of 0.010 inch. To the warm paste at 140°F (steam kettle) was added 1 percent by weight of finely ground salt. After thoroughly blending the mixture, it was cooled to 80°–90°F and passed through an extruder head (Palmer Engineering Company, De Pere, Wis.; U.S. Pat. No. 2,907,109) onto a continuously moving clear polyethylene film, 1 ¼ mill thick (available from the American Can Company, American Lane, Greenwich, Conn., Meriflex, 551–M–550) that is carried along by a continuously moving steel belt traveling at approximately 1.8 feet/minute. There is thus formed on the polyethylene film a strip of peanut butter approximately 3 ¼ inches wide by 0.08–0.10 inches thick.

The steel conveyor belt assembly is available from Sandvik Conveyor, Inc., Fairlawn, N.J. The belt contained two cooling sections providing about 8 feet of effective cooling area. The actual cooling was obtained with a Dunham-Bush chiller (AMPC 7.5). The moving cooled steel belt was maintained at a temperature of about 12°F. After being allowed to move along the polyethylene film carried by the cool steel belt for a sufficient time in order to harden the peanut butter, the cold peanut butter-polyethylene film laminate was cut into sections with a guillotine chopper, stacked and then wrapped with a moisture barrier plastic wrap.

After refrigerating the slices at 0°–10°F, they retain their shape and flavor well and are easily removed from the inner wrap of polyethylene film without any substantial sticking or adhesion or pulling apart of the peanut butter.

EXAMPLE 2

After roasting, about 30 pounds of peanuts were blanched and ground to form a paste. To the warm paste at 140°F was added about 3.2 percent of a melted mixture of edible mono- and diglycerides containing stearine, together with about 1 percent by weight of salt. After thoroughly blending the mixture it was cooled to 96°–102°F and passed through the extrusion head described in Example 1 onto a white, opaque polyvinylchloride film that was moving along the steel belt described in Example 1. The extruded peanut butter was cooled to about 15°F while traveling the length of the belt. After the peanut butter had sufficiently hardened, it was cut into appropriately sized slices with a guillotine chopper, and the slices were stacked in a series such that each peanut butter slice was interposed or sandwiched between two layers of the polyvinylchloride film. After maintaining the slices at 35°F it was found that they retained their shape and flavor well and could be readily stripped or peeled from the polyvinylchloride film without any significant sticking or adhesion to the film. substantially the same results were obtained when a polyethylene or polypropylene film was used instead of the polyvinylchloride film.

EXAMPLE 3

The experiment in Example 2 was repeated except that hydrogenated peanut oil (iodine value 1.5 meg/kg) was used instead of the mixture of mono- and diglycerides. After preparation of the final multi-layer sliced peanut butter composition it was found that after storage in a refrigerator individual slices of peanut butter could be easily peeled from the inner wrap packaging material without sticking or pulling apart.

EXAMPLE 4

The experiments in Examples 1–3 were repeated except that immediately after extrusion of the peanut butter ribbon various topping materials were added thereto. After traversing the cooled belt, these toppings were then pressed into the ribbon with a roller. The peanut butter ribbon containing the added foodstuffs was then cut into appropriate slices as described above and stored at refrigerator or freezer temperatures.

The following toppings of foodstuffs were added: chopped nuts, chopped candy, chocolate chips, butterscotch, dried fruits such as freeze-dried strawberries, raisins, dehydrated fruit pieces, grated cheese, bacon pieces, pickles, chopped olives, and the like.

The resulting slices were easily stripped from the inner wrap film after storage at refrigerator or freezer temperatures without sticking or pulling apart.

What is claimed is:

1. A method of preparing peanut butter in multi-layer sliced form which comprises the steps of:
   a. mixing a peanut paste, 1 percent of salt by weight and 3.2 percent by weight of a melted mixture of mono- and diglycerides at 140°F until the mixture is thoroughly blended;
   b. cooling the resulting peanut butter in (a) to about 96°–102°F and extruding it as a continuous layer onto a chilled moving continuous film of inert packaging material maintained at a temperature of about 15°F;
   c. further cooling the peanut butter so that it is substantially hardened to provide a laminate of peanut butter on the packaging material;
   d. cutting the resulting continuous peanut butter-packaging material laminate into sections; and
   e. stacking the sections in (d) in layers whereby each peanut butter section is interleaved between two layers of the inert packaging material.

2. A method of preparing peanut butter in multi-layer sliced form which comprises the steps of:
   a. extruding a continuous layer of peanut butter at about 80°–105°F onto a chilled moving continuous layer of inert packaging material maintained at a temperature of about 10–20°F;
   b. cooling the peanut butter until it is substantially hardened to provide a laminate of peanut butter on the packaging material;
   c. cutting the resulting continuous peanut butter-packaging material laminate into sections; and
   d. stacking the sections in (c) in layers whereby each peanut butter section is interleaved between two layers of the inert packaging material.

3. The method of claim 2 wherein the continuous layer of packaging material in (a) is cooled to about 15°F.

4. The method of claim 2 wherein after the peanut butter is extruded onto the packaging material in (a) at least one additional foodstuff selected from the group consisting of candy, dried fruit, chopped nuts, chocolate, cheese, bacon, pickles, olives, and raisins is added to the extruded layer of peanut butter.

5. The method of claim 2 wherein the peanut butter contains from about 0.5 to about 3.5 percent by weight of a hardened stabilizer selected from the group consisting of a mixture of edible mono- and diglycerides, a hydrogenated vegetable oil, a hydrogenated animal oil, anemixtures thereof.

6. The method of claim 5 wherein the peanut butter contains from about 2.9 to 3.5 percent by weight of hardening stabilizer.

7. A method of claim 5 wherein the peanut butter contains about 3.2 percent by weight of hardening stabilizer.

8. The method of claim 7 wherein the hardening stabilizer is a mixture of edible mono- and diglycerides.

* * * * *

UNITED STATES PATENT OFFICE
CERTIFICATE OF CORRECTION

Patent No. 3,772,038          Dated November 13, 1973

Inventor(s) James L. Ayres, et. al.

It is certified that error appears in the above-identified patent and that said Letters Patent are hereby corrected as shown below:

Page 1, in [75], Inventors; change to -- James L. Ayres; Stone Mountain, Ga; Jeffrey D. Peterson, Conyers, Ga; and John R. Palmer, De Pere, Wis. -- the assignee should read -- Gold Kist Inc., Atlanta, Ga., a corporation of Georgia --.

Column 1, line 32, change "buttter" to -- butter --
line 34, change "Furher" to -- Further --
Column 2, line 37, change "th" to -- the --
Column 3, line 56, change "1/4" to -- 3 1/4 --
line 68, before "size" insert -- to --
Column 4, line 40, change "termperature" to -- temperature --
line 46, change "wih" to -- with --
Column 5, line 42, change "substantially" to
-- Substantially --
Column 6, line 56, change "anemixtures" to -- and mixtures --

Signed and sealed this 17th day of September 1974.

(SEAL)
Attest:

McCOY M. GIBSON JR.
Attesting Officer

C. MARSHALL DANN
Commissioner of Patents